March 14, 1961 — R. R. POYNOR ET AL — 2,974,876
PORTABLE IRRIGATION APPARATUS
Filed April 22, 1958 — 2 Sheets-Sheet 1

Inventors:
Russell R. Poynor
Ray I. Throckmorton, Jr.
George Shute

March 14, 1961  R. R. POYNOR ET AL  2,974,876
PORTABLE IRRIGATION APPARATUS
Filed April 22, 1958  2 Sheets-Sheet 2
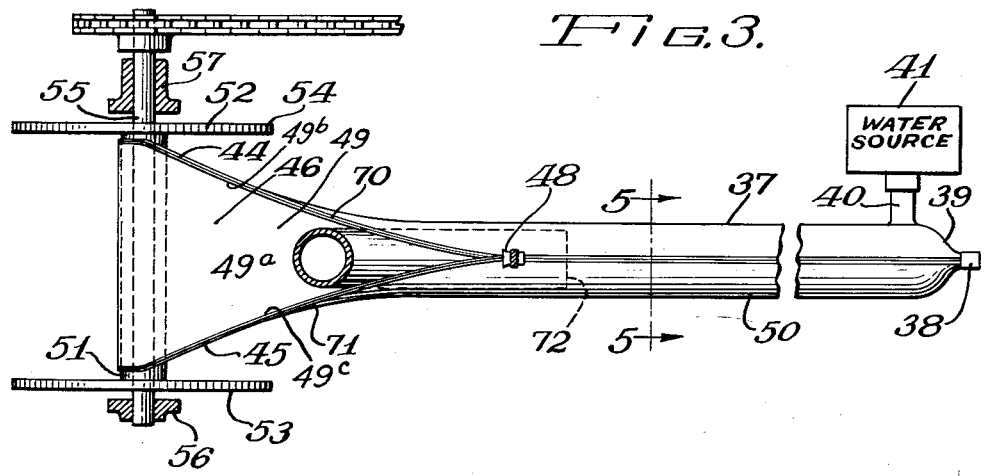
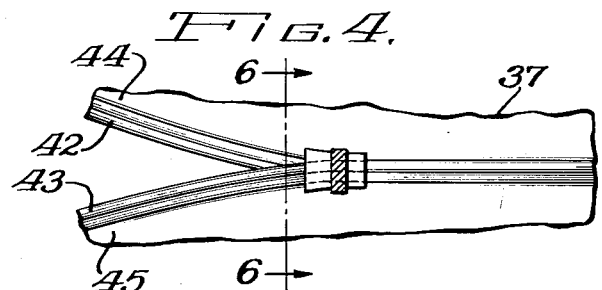
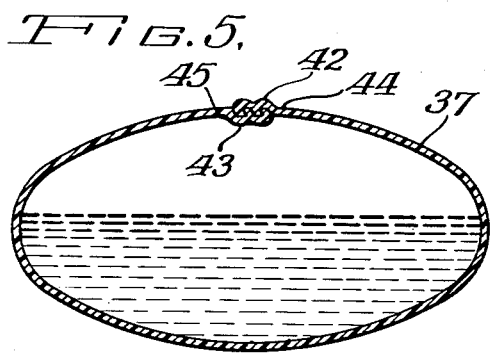
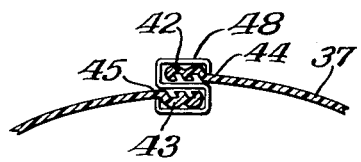
Inventors:
Russell R. Poynor
Ray I. Throckmorton, Jr.
George Shute
Paul O. Pippel Atty.

United States Patent Office 2,974,876
Patented Mar. 14, 1961

2,974,876

PORTABLE IRRIGATION APPARATUS

Russell R. Poynor, Geneva, Ray I. Throckmorton, Jr., Clarendon Hills, and George Shute, Naperville, Ill., assignors to International Harvester Company, Chicago, Ill., a corporation of New Jersey Filed Apr. 22, 1958, Ser. No. 730,137

2 Claims. (Cl. 239—183)

This invention relates to irrigation apparatus and more specifically to a portable rig.

The principal objection to any irrigation system lies in the difficulty of handling the water distribution system. This has heretofore taken the form of aluminum pipes or thin wall steel tubing which is transported on motorized wheels or carried or comprised a hose which was reeled onto a power unit and under favorable circumstances the water was taken from the ditch.

What preempts the extensive use of these systems and particularly those which use conduits, is the problem of transporting the conduits from place to place, and in the trench or ditch systems this involves taking several rows of crops out of production and presents a hazard to machinery crossing the ditch and furthermore, if the soil is sandy, there is too much water loss.

A general object of the invention is to provide a novel portable self-propelled irrigation unit incorporating a novel conduit which is adapted to be rolled onto a reel and which is flat on the reel so as to occupy a minimum of space and which is of light weight durable material which converts into a tube when unreeled.

A more specific object of the invention is to provide in a unit of the type described a novel conduit which comprises a flat sheet or ribbon of plastic material provided along its lateral edges with complementary zipper components so that the sheet or strip of material can be readily converted into a tube as it unreels from the drum and in return is adapted to be quickly unzippered so that it provides a flat sheet when it is reeled on the drum so as to occupy a minimum amount of space.

These and other objects of the invention will become more apparent from the specification and the drawings, wherein:

Figure 3 is a horizontal sectional view taken substantially in the planes indicated by the lines 3—3 of Figure 1;

Figure 4 is an enlarged plan view of a portion of the water conduit;

Figure 5 is a cross sectional view taken substantially on the line 5—5 of Figure 3; and Figure 6 is a further cross sectional view taken substantially on the line 6—6 of Figure 4.

Figure 1:
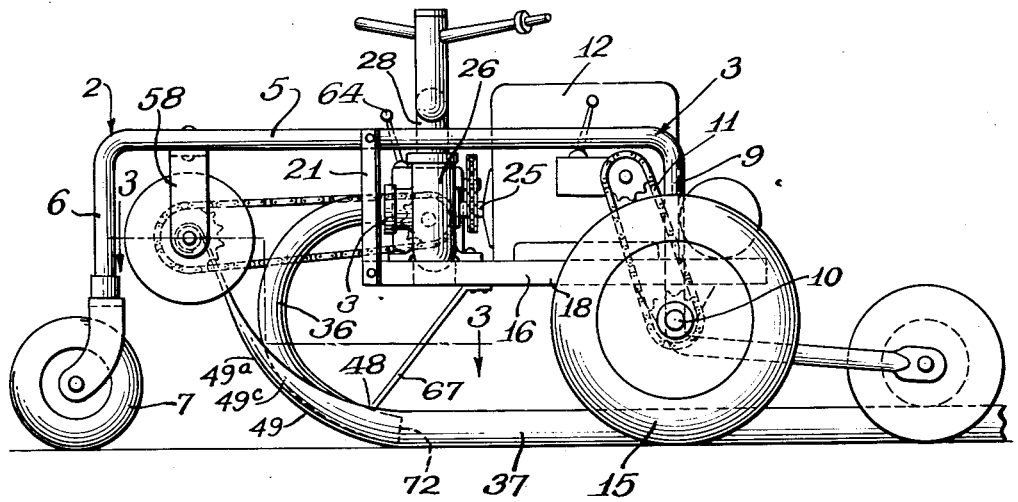
Figure 1 is a side elevational view of an exemplary form of self-propelled sprinkler in conjunction with the invention.
Figure 2:
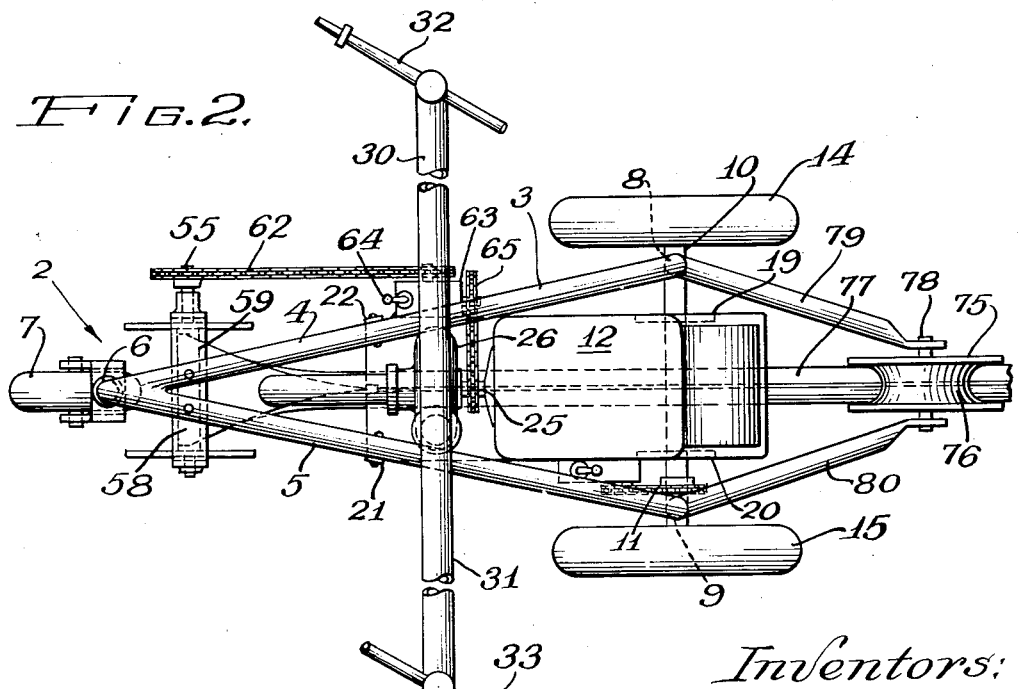
Figure 2 is a plan view of the structure shown in Figure 1.

Describing the invention in detail and having particular reference to the drawings, there is shown an ambulatory self-propelled unit generally designated 2 which comprises a frame work or arched frame construction 3 having a pair of fore and aft converging beams 4 and 5 which at their apex are integrated into a downwardly extending portion 6 which is carried upon a caster wheel 7. The converging ends of the beams 4 and 5 are each provided with downwardly extending portions 8 and 9, on the lower ends of which there is journalled an axle 10 which is driven by the drive means 11 from the engine 12, the axle 10 which may either be a low or high clearance mounting the large drive wheels 14 and 15.

The engine 12 is carried on a cradle 16 which comprises a bottom platform structure 18 suitably supported by brackets 19 and 20 from the axle 10 and from standards 21 and 22 which are connected to an intermediate portion of the beams 5 and 4, respectively.

The engine 12 may be provided with another output shaft 25 which may drive the pump 26 mounted on the cradle platform 18, the pump on its discharge side being connected to an upstanding pipe 28 which in turn may branch into branch lines 30 and 31 which mount sprinkler heads 32 and 33 which are preferably of the rotary type although any other type may be used.

The intake side 35 of the pump 26 is connected to a flexible conduit 36 which projects downwardly into the conduit 37.

The conduit 37 is provided with an anchor 38 at its free end which is adapted to be anchored to the ground and adjacent to its free end 31 is provide with an inlet coupling 40 which is adapted for connection to an associated water source 41 such as a main line or to any other source which supplies water under pressure such as a well pump. The conduit 37 comprises preferably though not necessarily a polyethylene plastic material or other suitable flexible material preferably plastic with mating zipper elements 42, 43 on its lateral edges 44 and 45 and these zipper elements comprise a plurality of interlocking beads arranged in tongue and groove relationship throughout the entire length of the sheet or ribbon of material 46 which is adapted to be unzippered by the slide zipper mechanism 48 whereupon the tube portion 50 opens up into a trough shaped portion 49 and then into a flat sheet so that it winds on the mandrel 51 to which it is secured between the side or end plates 52 and 53 of the reel generally designated 54 which is part of the support on which the ribbon is stowed, said reel having a center shaft 55 connected to the mandrel, which is journalled on bearings 56 and 57 supported by means of straps or hangers 58 and 59 from the main frame structure and specifically from the members 4 and 5. It will be noted that the shaft 55 of the reel 54 is driven by drive means 62 which includes a clutch operated gear train 63 which is adapted to be conditioned by the lever 64 to establish or disconnect the drive with respect to the drum from the power shaft 25 through the sprocket and chain assembly 65 which serves as an input to the gear train 63.

It will be noted that the zipper slide 48 is carried by a standard 67, which is mounted on the underside and extends downwardly from the platform 18 of the cradle structure.

*Operation of the device*

In operation after the device has been wheeled into the field the end 38 of the conduit structure is anchored in the desired location and the coupling 40 is connected to the water source. Of course, it will be understood that the anchor 38 may be eliminated and the coupling 40 may be used solely as the anchor for the conduct 37 by connection to a water main or the like. The tractive unit 2 is driven to its farthest point from the end 38 that is as far as the length of the conduit 37 will allow. It will be readily seen that as the reel discharges the film or the sheet 46, it converges as at 70 and 71 behind the conduit 36, the inlet 72 of which is within the conduit portion 50, and the zipper slide 48 zippers or interlocks the sheet's lateral edges via the elements 42 and 43 into a tube portion 50. The trough portion 49 is defined by bottom and side walls 49a, 49b, and 49c, and these walls rise above the level of the tube 50. It will be understood that under these conditions as the conduit is being unreeled, the lever 64 of the power train which drives the reel which is conditioned into neutral so that the material is allowed to unwind. Beginning from the farthest point from the source of water, the engine is actuated to drive the self-propelled unit and the driving train for the reel activated. The unit is guided by means of a guide wheel 75 which has a peripheral groove 76 receiving the conduit 37 therein, the wheel 75 being spindled as at 78 on a pair of arms 79 and 80 which are pivotally mounted on the axle 10.

It will be realized that the water would be pumped into the tube at a rate slightly greater than the rate at which the water would be withdrawn by the pump 26 on the ambulatory structure in order to insure a sufficient supply of water and any excess could readily spill over the edges although, of course, it will be realized that the two pumps could be arranged to pump at substantially the same capacity. After the conduit is completely reeled in, wheel structure 75 can be elevated by raising it upwardly and leaning it against the framework and the ambulatory unit can be moved elsewhere and the operation commenced in the same way as previously described.

What is claimed is:

1. In an irrigation apparatus, an ambulatory support, a ribbon of material stowed on a part of the support and having a free end and means thereon providing a water inlet, said ribbon having lateral edges with means interlocking with each other, said ribbon with said means interlocked being of tubular shape for conducting water, operating means on the support spaced from said part and operatively associated with said interlocking means for operating the same to interlock said interlocking means pursuant to removal of the ribbon from the part and disengaging the interlocking means attendant to stowing said ribbon on the part, said ribbon having a trough-shaped portion between said part and said operating means, and water distributing means on the support having an intake projecting into said trough-shaped portion and including a sprinkler head and pump means therefor for discharging the water on surrounding terrain.

2. In an irrigation apparatus, an ambulatory support, a ribbon of water impermeable material stowed on a part of said support and having a free end with means providing a water inlet from an associated source, said ribbon having lateral edges with interlocking means thereon, locking means on the support operatively associated with said edges for interlocking said means and spaced from said part, said material having a trough-shaped portion intermediate said part and said locking means and having a tubular-shaped portion rearwardly of said locking means and at an elevation lower than said part, and said trough portion sloping upwardly from said tubular portion to said part for containing water in said tubular and trough portions, and water distributing means on said support having an inlet extending into at least one of said portions of said material and having a sprinkler system for discharging the water on adjacent terrain.

References Cited in the file of this patent

UNITED STATES PATENTS

| | | |
|---|---|---|
| 2,371,042 | Fogg | Mar. 6, 1945 |
| 2,540,556 | Salatin | Feb. 6, 1951 |
| 2,570,573 | Liboiron | Oct. 9, 1951 |
| 2,585,054 | Stachura | Feb. 12, 1952 |
| 2,747,932 | Volk | May 29, 1956 |
| 2,756,172 | Kidd | July 24, 1956 |